United States Patent [15] 3,641,530

Schoenwitz [45] Feb. 8, 1972

[54] SYSTEM FOR DISPLAYING VALUES OF CONDITIONS REPORTED AT A CENTRAL STATION FROM VARIOUS REMOTE STATIONS OF A BUILDING AIR CONDITION SYSTEM

[72] Inventor: Frank H. W. Schoenwitz, Schaumburg, Ill.

[73] Assignee: Honeywell, Inc., Minneapolis, Minn.

[22] Filed: July 13, 1970

[21] Appl. No.: 54,174

[52] U.S. Cl. ........................340/183, 340/213 Q, 340/177 R, 340/204

[51] Int. Cl. ....................................G08c 19/04, G08c 15/12

[58] Field of Search ......................................340/213 Q, 183

[56] References Cited

UNITED STATES PATENTS

| | | | |
|---|---|---|---|
| 2,883,255 | 4/1959 | Anderson | 340/213 Q |
| 3,147,370 | 9/1964 | Lowman | 340/213 Q |
| 3,219,991 | 11/1965 | Freitas | 340/213 Q |

*Primary Examiner*—Thomas B. Habecker
*Attorney*—Lamont B. Koontz and Clyde C. Blinn

[57] ABSTRACT

A system for displaying the values of reported conditions of a building air-conditioning system wherein a reporting message from a remote station has a first portion for selecting the engineering units for the normalized condition value reported in a second portion of the message so that upon the message being received at a central station the first portion of the message is used to retrieve from a memory the engineering unit data to be applied to the normalized condition value to report the condition as a true reported value.

8 Claims, 8 Drawing Figures

PATENTED FEB 8 1972 3,641,530

SHEET 1 OF 3

INVENTOR.
FRANK H. W. SCHOENWITZ
BY
Clyde C. Blinn
ATTORNEY.

INVENTOR.
FRANK H. W. SCHOENWITZ
BY Clyde C. Blinn
ATTORNEY.

OFFSET

| OFFSET CODE | PRESET COUNT |
|---|---|
| 00 | 0 |
| 01 | -50 |
| 10 | -36 |
| 11 | -250 |

SCALING FACTOR

| SCALING FACTOR CODE | SCALING FACTOR |
|---|---|
| 001 | 1 |
| 010 | 2 |
| 011 | 3 |
| 100 | 4 |
| 101 | 5 |
| 110 | 10 |
| 111 | 8 |

DECIMAL POINT

| DECIMAL POINT CODE | DISPLAY APPARATUS |
|---|---|
| 00 | |
| 01 | |
| 10 | |
| 11 | |

| INPUT DATA TYPE ADDRESS (BINARY CODE) | ANALOG ENGINEERING UNITS | RANGE #3 (CODE 11) | RANGE #2 (CODE 10) | RANGE #1 (CODE 01) |
|---|---|---|---|---|
| (60) | PSI | 0 TO 999 | — | — |
| (61) | PSI | 0 TO 33.3 | 0 TO 99.9 | 0 TO 33.3 |
| (62) | DEG | 0 TO 499. | 0 TO 999. | 0 TO 099 |
| (63) | DEG | -50 TO 149. | 0 TO 249. | 0 TO 99.9 |

INVENTOR.
FRANK H. W. SCHOENWITZ
BY
Clyde C. Blinn
ATTORNEY.

SYSTEM FOR DISPLAYING VALUES OF CONDITIONS REPORTED AT A CENTRAL STATION FROM VARIOUS REMOTE STATIONS OF A BUILDING AIR CONDITION SYSTEM

SUMMARY OF THE INVENTION

The present invention is concerned with a system for displaying the values of conditions reported to a central station or panel from a plurality of remote stations or apparatus is a building air-conditioning control and supervision system. By means of a storage apparatus at the central station, engineering units data are provided to be selectively applied to any particular reported values of conditions from a remote station. In particular, when a message is sent from a remote station to the central station to report the value of a particular condition at that remote station as determined by a condition-responsive device, the data is reported in a normalized value. Upon the central station receiving the reporting message, a first portion of the message contains coded information for selectively obtaining from the storage apparatus the engineering units data for that particular station so that the normalized value as reported in a second portion of the message is transformed into a true reported value with the correct engineering units.

The present invention is disclosed in a drawing of which: station.

DESCRIPTION OF THE INVENTION

Figure 1:
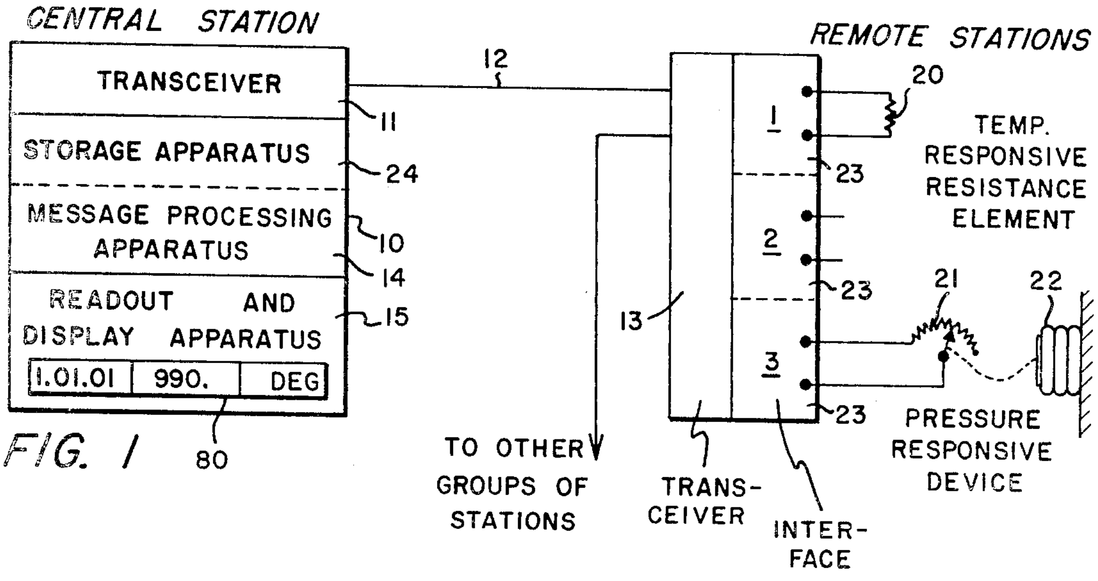
FIG. 1 is a schematic representation of a central station and a plurality of remote stations, two of which show apparatus for reporting the value of a condition to the central station.

Referring to FIG. 1, a central station 10 is connected over a transmission line to a plurality of remote stations. The central station has a transceiver 11 for sending and receiving messages over a transmission circuit 12 to a transceiver 13 associated with the remote stations. While the type of transmission system and the complexity of the system are no part of the present invention, one particular system is disclosed in the James R. Berrett et al. application Ser. No. 864,679, filed Oct. 8, 1969. Coded messages comprising a plurality of bits in binary form are sent and received from and to the central station to perform certain operations at the remote stations and to collect data from condition-responsive devices.

Central station 10 has a message-processing apparatus 14 and a readout and display apparatus 15 for displaying data collected from the remote stations. While the type of analog data collected from the remote stations can vary greatly, two particular remote stations are shown. Station 1 has a temperature-responsive resistance element 20 to provide a resistance output indicative of the temperature. Station 3 has a potentiometer 21 which is positioned by a pressure-responsive bellows 22 for providing a resistance output indicative of the pressure. Both of these stations contains interface equipment 23 for converting the value of the resistance to a normalized data value. One particular type of interface apparatus is disclosed in the Frank H. W. Schoenwitz application Ser. No. 865,820 and filed Oct. 13, 1969, wherein the output of the remote stations either provides a message for the data in period form or in binary code decimal (BCD) form and upon the message containing the data being received at the central station, message-processing apparatus 14 processes the message. For example, stations 1 and 2 have a normalized value range of 0 to 999 for the particular range of temperature sensor 20 and pressure sensor 22. The normalized value is transformed to a true reported value.

The message-processing apparatus 14 has a storage apparatus or fixed memory 24 such as a Read Only Memory in which engineering units data is stored for the particular type of apparatus used at the various remote stations. The data is obtained from the storage apparatus by selectively coding the message from a particular remote station so the normalized value of the condition of the remote station is transformed and displayed in a true value range as diagramically represented in FIG. 8.

Figure 2:
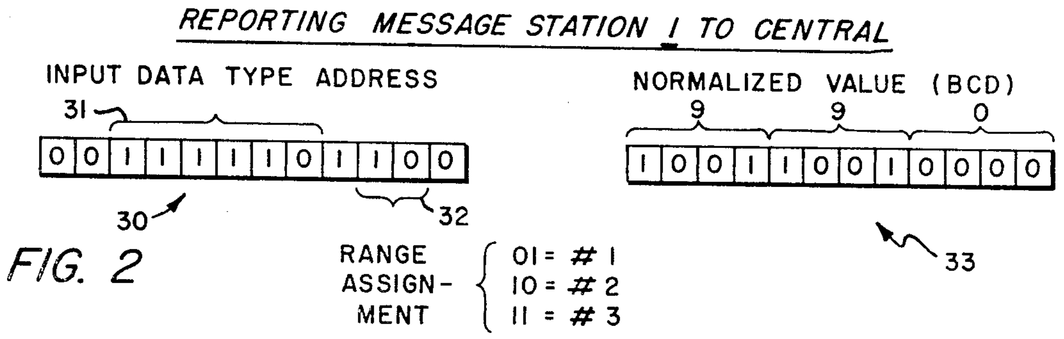
FIGS. 2 and 3 are typical reporting messages sent from remote stations to the central station.

An example of a reporting message or word for station 1 is shown in FIG. 2. The reporting message has a first portion 30 made up of 12 bits in binary form. Six of the bits 31 are coded for the input data type and two of the bits 32 are used for one of the three range assignments. A second portion of the message 33 is the normalized value (shown as 990) of the condition or temperature of the station in BCD form. A similar reporting message is shown in FIG. 3 for station 3 reporting the normalized value (shown as 900) of the pressure sensed by bellows 22.

Figure 4:
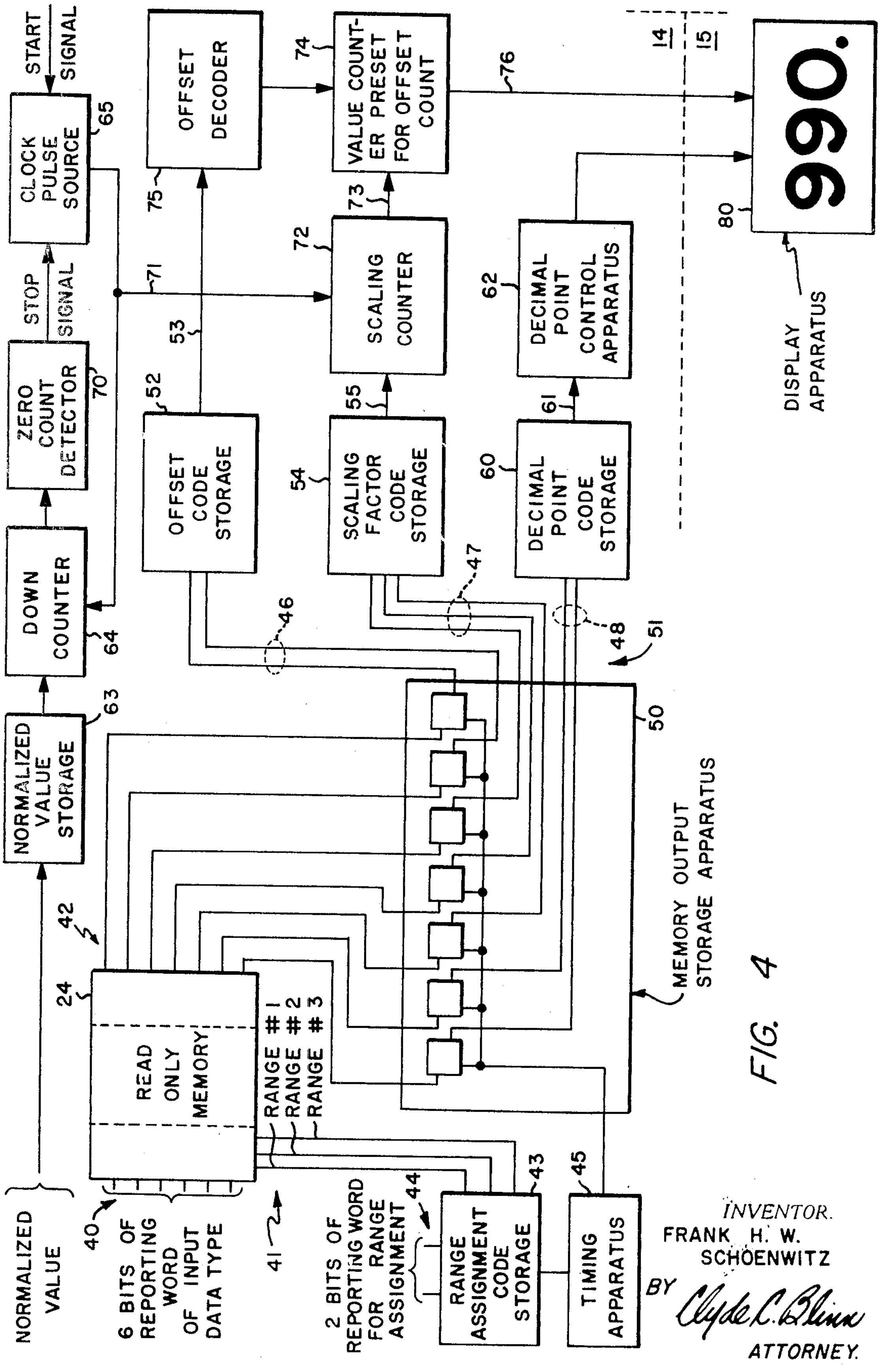
FIG. 4 is a schematic representation of the circuit apparatus for obtaining from the storage apparatus certain data to be applied to the normalized value for readout or display.

Referring to FIG. 4, a detailed portion of the central station, specifically processing apparatus 14, display apparatus 15, and storage apparatus 24 are shown. Storage apparatus 24 which might be of a Read Only Memory (ROM) type has six binary input circuits 40; so that, when the memory is selectively strobed by one of the three strobing circuits 41, a prearranged (binary) output is obtained on the seven output circuits 42. The specific operation of such a Read Only Memory circuit for obtaining information for other purposes such as a character generator is disclosed in a copending Frank H. W. Schoenwitz application Ser. No. 19,980 filed Mar. 16, 1970.

Figure 3:
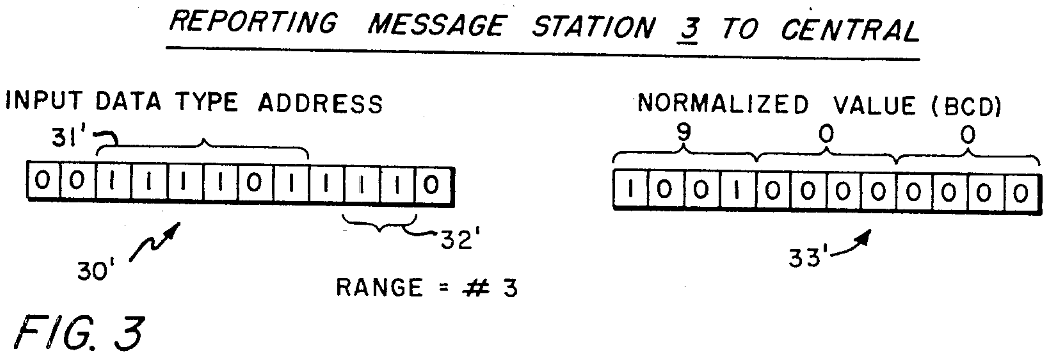

The input circuits 40 are connected in the message-processing apparatus to receive six bits of (binary) information from the reporting message input data type, such as 31 and 31' in FIGS. 2 and 3 respectively. The strobing operation accomplished by selectively energizing one of circuits 41 is provided by the output of the range assignment code storage 43. An input 44 received from the message-processing apparatus to provide the two bits of (binary) information from the reporting message for the range assignment which is shown as 32 and 32' in FIGS. 2 and 3 respectively. By means of an appropriate timing apparatus 45, the range assignment code storage 43 and memory output storage apparatus 50 are sequentially energized to provide a binary output from the memory output storage apparatus 50 at the seven output circuits 51 needed to provide one of the ranges for the true value of normalized data in the ranges shown in FIG. 8.

Specifically when the six bits of information from the input data type of the reporting message is applied to input 40 of storage apparatus 24 and the storage apparatus is strobed by one of the strobing inputs 41 depending upon the two-bit code from the range assignment of the reporting word, a seven-bit word is obtained from output 42 to be held in the memory output storage apparatus 50 for use at the appropriate time. For example, with an input address 31 and a range assignment 32, one of the ranges shown in FIG. 8 for the true reported value of the normalized value is selected.

The binary output circuits 51 are divided into three groups or portions. The first group 46 of two binary output circuits 51 is connected to the input of an offset code storage 52. The offset code provides the preset count at output 53 as shown in the table in FIG. 5. A second group 47 of three binary output circuits 51 is connected to the input of the scaling factor code storage 54. The scaling factor code provides a divident or scaling factor from output 55 as shown in the table in FIG. 6. The last group 48 of two binary output circuits 51 is connected to the input of the decimal point storage 60. The decimal point code provides an output at 61 for energizing the decimal point control apparatus 62 whereby the decimal point is positioned in the display apparatus 15 in one of the positions as shown in the table of FIG. 7.

While first portion 30 of a reporting message, of FIG. 2, is being processed by the message-processing apparatus 14, second portion 33 containing the normalized value of the input data is stored in the normalized value storage 63. Since the system makes use of apparatus for reporting all conditions from stations with outputs in the normalized value having a range of 0 to 999, the output of storage 63 is connected to a preset down counter 64. Counter 64 is preset at the normalized value which from the particular reporting word shown in FIG. 2 is 990. A clock pulse source 65 is started and continues to run until the counter 64 reaches 0 as detected by 0-count detector 70 to provide a stop signal to clock pulse source 65. An output at 71 provides a pulse count of 990 to be fed into scaling counter 72.

Figures 5, 6, 7, 8:
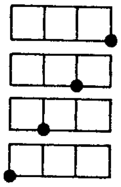
FIGS. 5, 6 and 7 represent the particular message code used for engineering units such as offset, scaling factor and decimal point.
FIG. 8 is a table schematically showing data which is obtained by the reporting message.

Scaling counter 72 divides or changes the count from clock pulse source 65 by the scaling factor shown in the table of FIG. 6 to provide an output at 73 depending upon the scaling factor. For example, a scaling factor of 2 divides the clock pulse source in half to 445.

A true value counter 64 is preset by the output of the offset decoder 75 upon receiving the offset code from output 53, such as subtracting 50 for a code (01) of FIG. 5. Counter 75 receives the output at 73 to provide a value count at output 76 which is connected to display apparatus 15 having a digital display counter of apparatus 80. After apparatus 80 receives the finished count of value counter 74 and the decimal point control apparatus positions the decimal point.

OPERATION OF THE INVENTION

Assuming that a reporting word as shown in FIG. 2 is received to report data from station 1 to the central station. The reporting word has the six-bit-coded input data type 31 which provides the input data type address of numeral value 62 in the form of six-bit binary code 111110.

In FIG. 8, input data type address 62 has been assigned analog engineering units of degrees. The generation of the characters of DEG for degrees for display at 80 in FIG. 1 is no part of this invention, but is described in the mentioned Schoenwitz application Ser. No. 19,980.

The reporting word shown in FIG. 2 has a range assignment 32 having the two bits (10) for the No. 2 range as shown in the table of FIG. 8. From this input data word made up of the six-bit and two-bit parts there is stored in the storage apparatus seven bits of information to transform the normalized data to a true value between 0 to 999. From the output 42 in FIG. 4 an offset shown in FIG. 5, a scaling factor shown in FIG. 6 and a decimal point shown in FIG. 7 is provided to make up the true value of the data for display on display apparatus 80.

Specifically, the six bits 111110 (62) for input data type 31 and the range assignment 32 by the two bits 10(2) of the reporting message of FIG. 2 produces a seven-bit output at 42 in FIG. 4 of 0000100 (00 = no offset, as shown in FIG. 5, 001 = a scaling factor of one as shown in FIG. 6, and 00 = a decimal point in the far right position as shown in FIG. 7. Using the seven bits of information from the outputs 51 of memory output storage apparatus 50, three steps are performed. The output of clock pulse source 65, which is counted up to 990 by the normalized value output from second portion 33 of the reporting word in FIG. 2, is not changed by scaling factor counter 72. The true value counter 74 is not offset to provide an output for display apparatus 80 of 990. Thirdly, the decimal point control apparatus fixes the decimal point to the far right position to provide the reported value of 990 on the display apparatus 80.

Similarly the reporting word as shown in FIG. 3 for station 3 is processed by the message-processing apparatus to make us of the input data type 31' and the range assignment 32' to display a true value as shown in FIG. 8 under range No. 3 for an input data type address of 61 between 0 to 33.3 for a pressure at the pressure-responsive device 22 of FIG. 1 in pounds per square inch (p.s.i.).

Storage apparatus 24 provides an output on circuits 51 of 0001101 (00 = no offset as shown in FIG. 5, 011 = a scaling factor of 3 as shown in FIG. 6, and 01 = a decimal point in the second place as shown in FIG. 7. For the particular reporting word as shown in FIG. 3, clock pulse source 65 of FIG. 4 is pulsed by the normalized value of 900 and the scaling counter scales the output at 73 by 3 to provide an output count of 300 to value counter 74. Since the value counter is not offset a digital output of 300 is sent to display apparatus 80. The decimal point control apparatus places the decimal point in the first place and a true value of 30.0 is displayed on apparatus 80.

The embodiments of the invention in which an exclusive property or right is claimed are defined as follows:

1. In a system for reporting values of conditions of a building air-conditioning system,
   a central station comprising:
      message-receiving apparatus for receiving messages, the messages comprising a first portion for selecting engineering units and a second portion indicative of the normalized value of the condition, and
      message-processing apparatus comprising,
         means for processing said first portion of the messages to provide a first output indicative of selected engineering units for converting a normalized value of a condition to a true value of said condition,
         means for processing said second part of the messages to provide from said normalized value of the reported condition a second output, and
         processing means connected to receive said first and second output to provide a true reported value of said condition, and
   a plurality of remote stations, comprising;
      message-transmitting apparatus for transmitting messages,
      condition-responsive means for at least one station, said responsive means having an output indicative of a normalized value of a condition, and
      interface means connecting said condition-responsive means to said message-transmitting apparatus to transmit a message having said first portion for selecting the desired engineering units of the output of said condition-responsive means and said second portion indicative of said normalized value of the reported condition, and
   transmission means connecting said message-transmitting apparatus to said message-receiving apparatus.

2. The invention of claim 1 wherein, said means for processing said first portion of the messages comprises;
   memory means for storing engineering units selectively obtained therefrom, whereby said first output from said memory means depends upon said first portion of the message.

3. The invention of claim 2 wherein,
   said first output of said memory means comprising:
      an offset output indicative of a value of offset to be applied to said normalized value,
      a decimal point position output indicative of the position of a decimal point when said reported value is determined, and
      a scaling factor output indicative of a scaling factor to be applied to said normalized value.

4. The invention of claim 3 wherein,
   said first portion of said message comprises six bits in binary form and two bits in binary form for selecting said offset output of said memory means.

5. THe invention of claim 4 wherein,
   said memory means is a fixed memory having six input circuits, three strobing circuits and seven binary output circuits,
   said six input circuits being connected to be energized in accordance with the binary code of said six bits of said first portion of said message,
   said strobing circuits being connected to be energized in accordance with the binary code of said two bits of said first portion of said message, and
   said seven output circuits provide said offset, decimal position and scaling factor outputs.

6. The invention of claim 1 wherein, said means for processing said first portion of the messages comprises a Read Only Memory having six binary input circuits ad seven binary output circuits, said input circuits being connected to receive binary signals for said first portion of the messages to select the engineering units to be applied to make said true reported value of a condition, and said output circuits providing three groups of outputs for said engineering units, a first group of two circuits to select one of a plurality of offset values, a second group of three circuits to select one of a plurality of scaling factors and a third group of two circuits to select one of a plurality of possible decimal point positions.

7. The invention of claim 6 comprising, clock pulse source means connected to said means for processing said second part of said messages and controlled by said second output to provide a number of pulses indicative of said normalized value of said condition, scaling means connected to receive said pulses from said clock pulse source means and having a pulsing output of a different rate depending upon said scaling factor received from said second group of circuits, counter means having an offset means connected to said first group of circuits to offset said counter means by one of said plurality of said offset values, said counter means receiving said pulsing output of said scaling means, and display means connected to said counter means to display a true reported value of the condition, said display means being connected to said third group of circuits to provide a decimal point in a displayed true value of the condition.

8. The invention of claim 1 wherein, said means for processing said second part of said messages connected to a pulse source providing a plurality of pulses indicative of the normalized value of the condition, said means for processing said first portion of the messages comprising memory means wherein said first output is made up of three portions, said processing means comprising;

scaling means connected to said pulse source to modify the number of said plurality of pulses depending upon one of said portions of said first output, true value counter means connected to one portion of said output for presetting said true value counter means by a predetermined offset count, means connecting said true value counter means to receive said modified number of pulses whereby a total count of said true value counter means includes said predetermined offset count and said modified number of pulses, digital display means connected to said true value counter means to display said total count, and decimal point setting means connected to said display means to set a decimal point in said total count depending upon one of said portions of said first output.

* * * * *